United States Patent [19]

Chapman

[11] Patent Number: 4,710,120

[45] Date of Patent: Dec. 1, 1987

[54] APPARATUS FOR REMOVING A DIE FROM A DIE RING

[75] Inventor: James B. Chapman, Pierce City, Mo.

[73] Assignee: Revere Copper and Brass Incorporated, Stamford, Conn.

[21] Appl. No.: 809,977

[22] Filed: Dec. 17, 1985

[51] Int. Cl.$^4$ .............................................. B29C 47/08
[52] U.S. Cl. ..................................... 425/185; 425/186; 425/190
[58] Field of Search .................. 425/190, 192 R, 185, 425/186, 182; 72/255, 263; 164/345; 225/97, 103

[56] References Cited

U.S. PATENT DOCUMENTS

| | | | |
|---|---|---|---|
| 2,766,497 | 10/1956 | Noyes | 164/345 |
| 2,858,017 | 10/1958 | Kent et al. | 72/255 |
| 3,653,247 | 4/1972 | Huertgen | 72/263 |
| 3,844,151 | 10/1974 | Huertgen | 72/263 |
| 4,048,832 | 9/1977 | Raab et al. | 72/255 |
| 4,103,529 | 8/1978 | Huertgen et al. | 72/255 X |
| 4,221,315 | 9/1980 | Latchague | 225/97 |
| 4,416,138 | 11/1983 | Freese et al. | 72/263 |

Primary Examiner—Richard L. Chiesa
Attorney, Agent, or Firm—Pennie & Edmonds

[57] ABSTRACT

Apparatus for use in separating a die from a position within a die ring. The apparatus includes a first and second support, each including an opening and a hopper below the opening. At least one of the supports includes a pair of locater members to locate the die ring in position both over the opening and below a plunger of a mechanical operator moving along a path of movement coaxial with the opening. Each opening is of a size to restrain the die ring and allow the die to release to a hopper.

5 Claims, 3 Drawing Figures

APPARATUS FOR REMOVING A DIE FROM A DIE RING

DESCRIPTION

TECHNICAL FIELD

The invention relates to apparatus for use in separating an inner member from an outer, supporting member under circumstances that the members may be in a tight frictional engagement. The members may comprise a die and a die ring, respectively.

BACKGROUND OF THE INVENTION

As may be well known, in the operation of an extrusion press, a billet or slug of material is extruded through one or more orifices formed in a die supported by a die ring in the extrusion press. The forces on the die and die ring during an extrusion operation are significant and it is not uncommon that the die may be forced into a position within the die ring such that a significant mechanical force is required to separate the components. This action poses a problem under circumstances that one die is to be replaced by another die.

According to techniques commonly practiced in industry the die is separated from the die ring by hammering repeatedly on the surface of the die to effect its release from the die ring. To this end, the die and die ring are first removed from the extrusion press and the hammering action is carried out while the die ring is in the hand. The die and die ring, as may be apparent, oftentimes are quite heavy so that handling is difficult, and it is also not uncommon that the die and the die ring when they are removed from the extrusion press will have retained a measure of heat from the extrusion process. The fact that the components are hot adds to the difficulty in handling. Under these circumstances, it is likely that the die when it releases from the die ring will fall to the floor causing possible damage to the die structure. Damage to the die structure may also result from the hammering operation. And, the operations may result in injury to personnel.

SUMMARY OF THE INVENTION

The present invention seeks to overcome the problems and disadvantages of the prior art by providing apparatus for both supporting a die and die ring and effecting a release of the die under circumstances that the die ring remains supported. The apparatus comprises a housing and at least one, but preferably two locations for supporting the die and die ring. A hopper is located closely below each support location to receive the die which will fall only a short distance after release from the die ring. Typically, the die ring is annular in outline, although other outlines are envisioned and the use of the term "ring" is characterizing the structure for support of the die is not to preclude within its definition other outlines of die ring, such as polygonal, square, and so forth. Each support location is characterized as a shelf and each shelf is disposed in substantially a horizontal plane between a top and bottom of the housing. An opening is formed in each shelf above the hopper. The opening will be of an outline generally conforming to that of the die, although slightly larger in size. Thus the die may fall by gravity through the opening, into the hopper, when it releases from the die ring, while the surface around the opening will restrain movement of the die ring Action may be carried out manually on the die to separate it from the die ring or the action may be carried out by mechanical means.

The apparatus also includes structure located on at least one shelf for positively locating the die ring and die relative to the opening. In addition, the surface around at least one opening may be in the form of a neck providing additional strength to the shelf during action by the mechanical means. In a specific embodiment of the invention, the mechanical means may be characterized by a double acting cylinder, a piston and a plunger movable in opposite directions and a control which may be a pneumatic or hydraulic operator or the equivalent.

Other advantages of the invention will become apparent as the description to be read in conjunction with the drawing, continues.

BEST MODE FOR CARRYING OUT THE INVENTION

Figure 1:
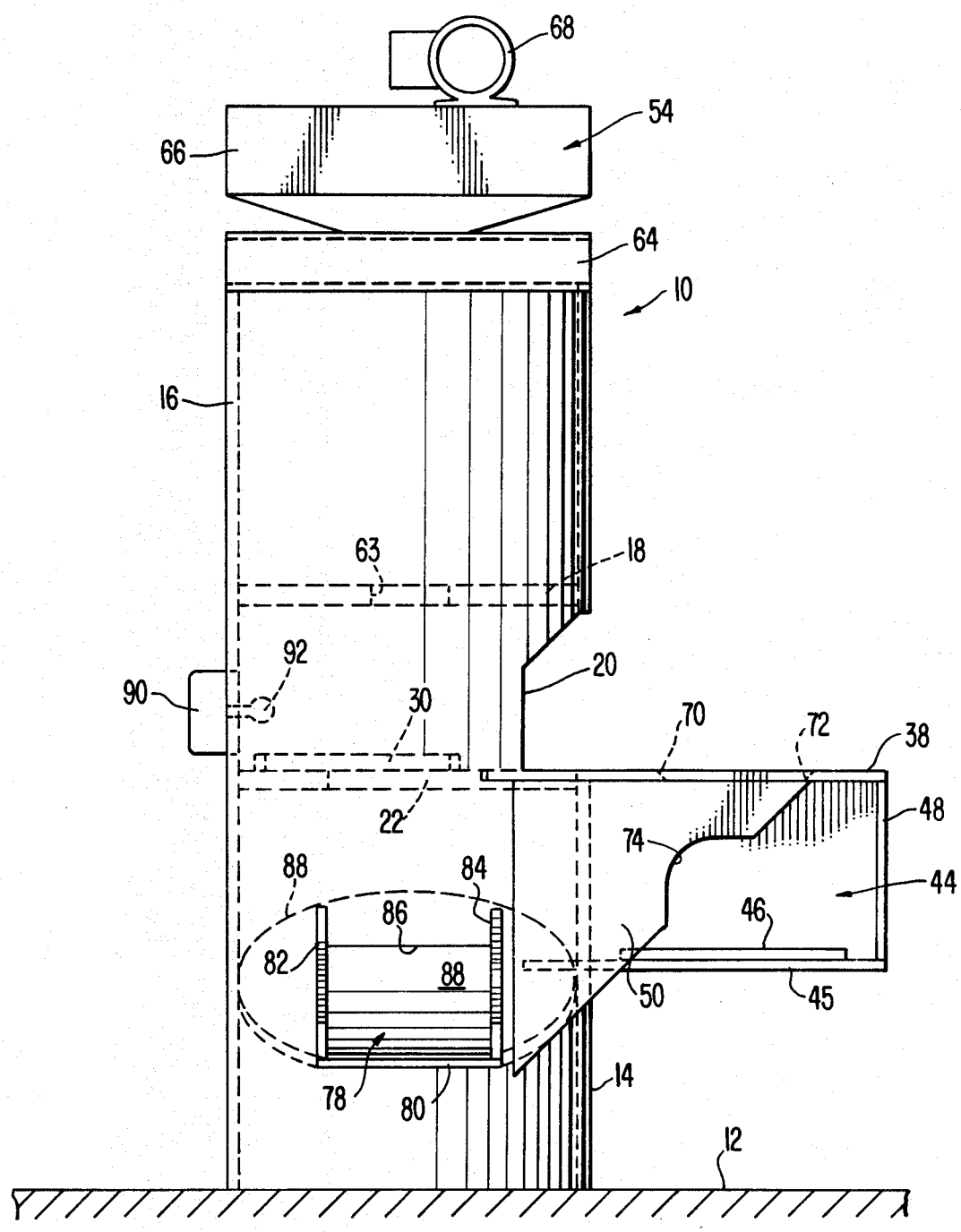
FIG. 1 is a view in side elevation of the housing of the present invention.
Figure 2:
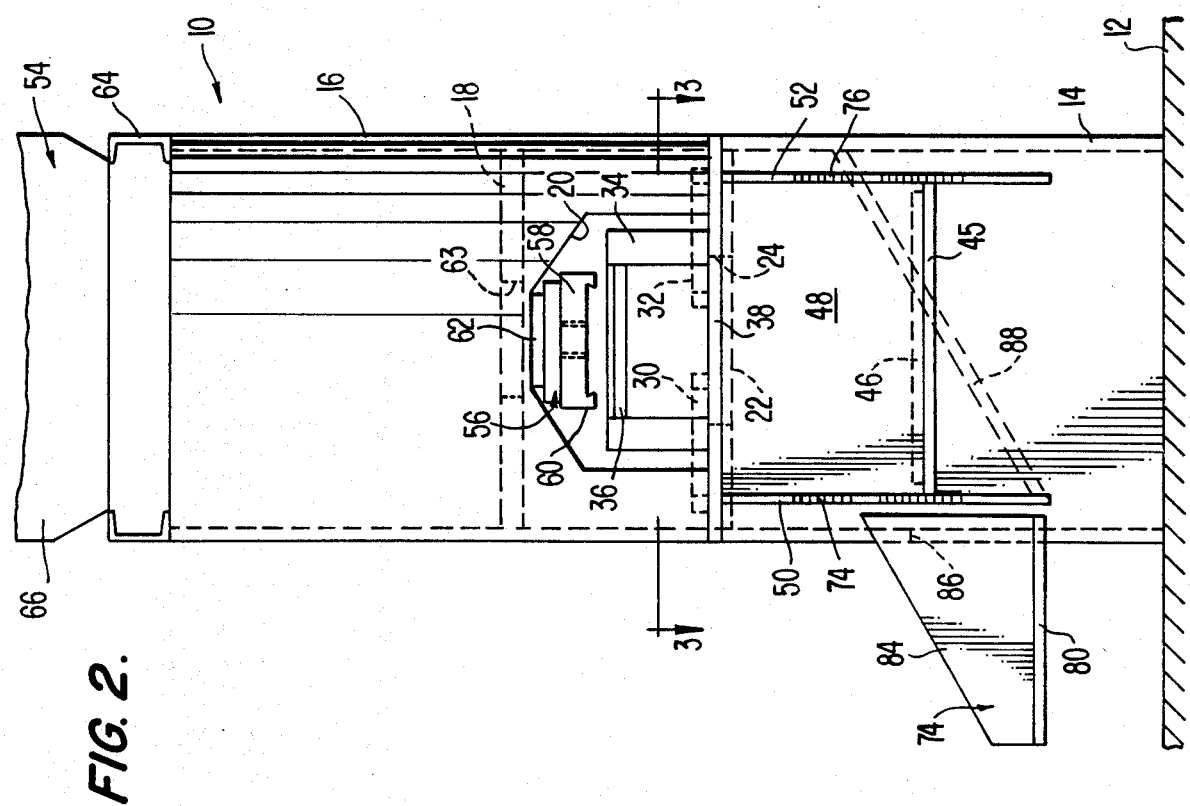
FIG. 2 is a view in front elevation of a portion of the housing as seen in FIG. 1.

The apparatus of the invention is perhaps best illustrated in FIGS. 1 and 2. The apparatus includes a housing 10 supported by internal frame components for residing on a surface 12, such as the floor of a building. The housing and frame components may be of any particular construction, and formed of typical construction materials to provide strength and rigidity to the overall structure for the purposes as will be described.

The housing will be of substantially cylindrical outline, approximately 2 to 3 feet in diameter and it may be approximately 6 to 7 feet in height to provide a work location at a satisfactory height. These dimensions, however, and the dimensions to be discussed, should be considered representative of typical dimensions that may be employed and should be viewed in that manner rather than in a limiting sense.

The housing includes a lower portion 14 and an upper portion 16. One of the frame components for reinforcing the housing is represented by reinforcing member 18 in the upper portion of the housing, immediately above an opening 20. The opening provides access into the internal confines of the housing. The reinforcing member may be a plate which extends between the internal walls of the housing. The plate is secured to the housing by any structure as may be conventional, for example, an angle member (not shown) secured to the internal wall of the housing. A support location or shelf 22 is located within the lower portion of the housing. The shelf is located at the lower extreme of opening 20 and together with other reinforcing members (not shown) although like reinforcing member 18 suitably reinforces the lower portion of the housing. The shelf may be supported within the housing in the manner of support of reinforcing member 18. As perhaps best illustrated in FIG. 3, the shelf is circular in outline and includes an opening 24, concentric with the inner wall of the housing. The opening may be surrounded by a neck 26 extending somewhat above the plane of the shelf. The neck may add support to the shelf during operation of a mechanical means for acting upon the die. The opening is beveled inwardly as indicated at 28.

A pair of locater members 30,32 are supported on shelf 22 in a position tangent to neck 26. The points of tangency are somewhat removed from the opening and according to the disclosed preferred construction are at a location that the locater members converge toward one another at the rear of the housing at an angle of approximately 60°. Thus, the entry between the locater members faces opening 20 so that the die ring 34, illustrated only in FIG. 2, may be properly located relative to opening 24. Accordingly, a die 36, when it releases from the die ring, will fall through the opening.

As may be apparent, the dimensions of the shelf 22 will vary according to the size of die ring to be accommodated. To accommodate a die ring having a 13-inch outer diameter and a 6-inch height, the opening 24 may be of a diameter of approximately 10½ inches. Each locater member may be in the form of a plate approximately 1×1×15 inches on a side, and the points of tangency between the locater members measured by a chord connecting the points may be approximately 11¼ inches.

A second support location or shelf 38 extends outwardly of the housing and in alignment with both opening 20 and shelf 22. Shelf 38 preferably is coplanar with the shelf 22. Although not clearly illustrated, the second shelf is partially supported within the region of extensions 40 and 42 which slightly wrap around the housing. The second shelf may be of a width substantially equal to the diameter of the housing and it may extend outwardly of the housing throughout a distance of about 24 inches.

A hopper 44 is located below shelf 38. The hopper comprises the space outlined by a bottom plate 45, a front plate 48 and a pair of side plates 50,52. A plate 46 which may be an aluminum plate having a dimension of approximately ¾×12×18 inches is disposed on the bottom plate and provides a surface on which the die 36 will fall. The side plates 50,52 provide additional support for both the shelf and the hopper on housing 10.

Referring again to FIG. 2, one may generally see a mechanical means providing a driving movement to a plunger 56. The plunger includes a body 58 having a lower, outer annular ridge or ring 60 which is moved into contact with die 36. The contacting position preferably is in a region outward of each orifice formed in the die ring. Ring 60 may be about 8 inches in diameter, about ⅜ inch in thickness and about ⅜ inch in height although the dimensions will change for different sizes of die ring and die. A rod 62 which connects the body of plunger 56 to the mechanical means for movement in opposite directions extends upwardly of housing 10, through opening 63 in reinforcing member 18.

The mechanical means may be any form of structure capable of developing a force for purposes of acting on die 36 in its release from the die ring 34. For example, the mechanical means, supported by an angle piece 64 at the upper region of housing 10, may be a pneumatic or a hydraulic operator. The angle piece will also provide reinforcement and support for the upper portion 16 of housing 10. As illustrated in FIG. 1, and partially illustrated in FIG. 2, the mechanical means includes a reservior 66 with a motor and vane pump 68 for energizing a double acting cylinder (not shown) for driving plunger 56 in each of its directions of movement. The motor may be a 5 horse power motor with a Sperry Vickers Vane pump.

Figure 3:
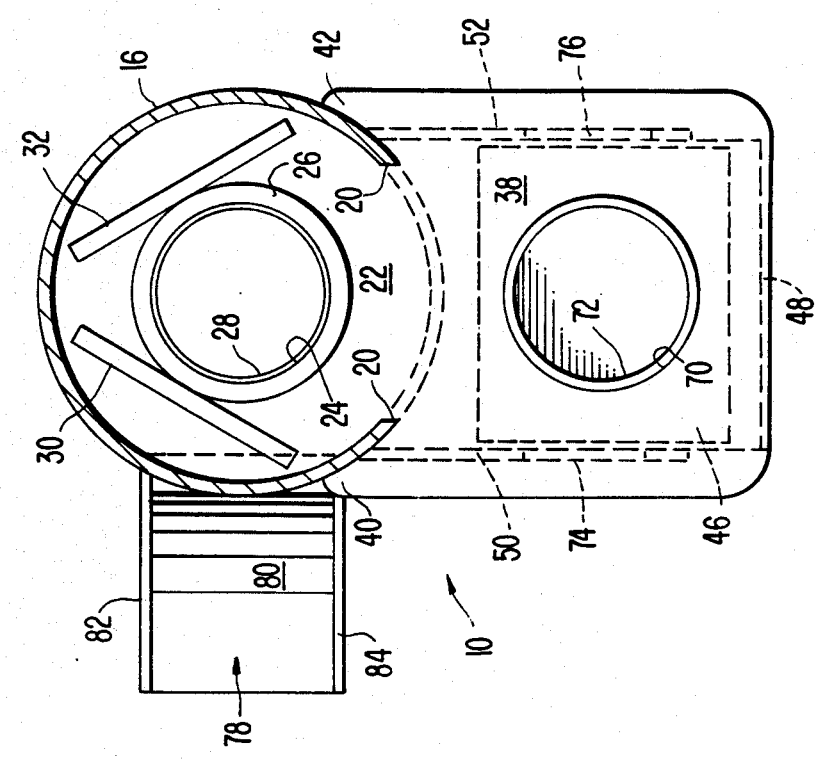
FIG. 3 is a view in section as seen along the line 3—3 in FIG. 2.

In the use of the apparatus, a die and die ring once removed from the extruder may be located to shelf 38. As seen in FIG. 3, the shelf includes an opening 70 immediately above hopper 44. The shelf may be at a height of about 2½ ft. above floor 12, a height convenient to carry out a first manipulative action. The opening is centered within shelf 38 and is of a size substantially equal to the size of opening 24 in shelf 22. The edge of the opening may be beveled at 72. The first manipulative action follows placement of the die ring on shelf 38 above and around opening 70. The manipulative action carried out may be a simple hammering upon the die with a maul. And, it has been found that the die will release from the die ring in a sizable percentage of operations following this action. The die which may release from the die ring will fall through the opening and land in position on the aluminum plate 46 of hopper 44. The die will be generally confined in movement by plate 48 and side brackets 50,52. A cut out 74 formed in side bracket 50, and a similar cut out 76 formed in side bracket 52 will assist in removing the die from the hopper. The frame structure of housing 10 may be formed from a sturdy material, such as iron or the equivalent. The aluminum plate which is a somewhat softer material will provide a bed upon which the die 36 will land after release from the die ring 34.

In the event that the die fails to release from the die ring, the die and die ring are located within the housing and positioned by locater members 30,32 over opening 24. The locater members will stabilize the die ring against movement laterally. Mechanical means 54 is energized and plunger 56 is caused to traverse the space between a position of rest above the die to a position at which the ring 60 of plunger 56 is situated on the surface of the die. The force developed through operation of the motor 68 will act to force the die 36 to release from the die ring 34. The die, then, will fall by gravity through opening 24. A second hopper 78 is supported within the lower portion 14 of housing 10 below opening 24. The hopper is characterized by a bottom plate 80 and a pair of side plates 82,84 located outwardly of the housing, yet communicating with the interior of housing 10 through an opening 86. The hopper serves as a catch for the die after it has released from the die ring. To this end, the hopper also includes a plate 88 positioned below opening 24 and inclined toward opening 86. The plate 88 may be approximately ½ inch in thickness and formed of the material of plate 46. The plate, further, is oval or elliptical in outline having a major axis of 26 inches and a minor axis of 22½ inches. The plate may be angled at about 30°.

An electrical box 90 including a socket for a light bulb 92 is supported by housing 10. The light is located to the rear of opening 20 to illuminate the interior of the housing so that the action of plunger 56 against die 36 may be visually recorded.

I claim:

1. In combination, apparatus comprising an assembly in the form of a housing surrounding an enclosed space along a substantially vertical axis, a first working surface supported within said housing between its ends, said first working surface disposed stationarily in substantially a horizontal plane and including an opening, a hopper in said housing below said opening, locator means formed by a pair of members each supported by said first working surface on opposite sides of said opening, said members having a side surface extending vertically of said first working surface and disposed in positions whereby said side surfaces confront one another along paths that converge from the region of a point of tangency at equiradial and equiangular locations from the axis of said opening and a diameter through said axis, repsectively, said members, further, forming a pocket defined by said points of tangency for positional receipt of a ring-like structure carrying a removable member, and mechanical means supported stationarily within said housing above said first working surface, said mechanical means including a plunger having a ring-like extension toward said opening around an outer periphery, said plunger being movable in opposite directions along the axis of said opening whereby said ring-like extension in downward movement is received within said ring-like structure for contacting said removable member around its outer edge with a force to cause said removable member to release from said ring-like structure and fall through said opening into said hopper.

2. The combination of claim 1 further including a neck formed in said first working surface around said opening, and said members being disposed adjacent said neck.

3. The combination of claim 1 further including a chute, said chute supported by said housing and located between said opening and hopper, said chute being angled toward said hopper to direct said member into said hopper.

4. The combination of claim 1 further including a second working surface, said second working surface being mounted by said housing and comprising an extension of said first working surface, said second working surface also having an opening of a size substantially coextensive with the size of opening in said first working surface, and a second hopper below said second working surface.

5. The combination of claim 1 wherein said mechanical means is an hydraulic operator.

* * * * *

UNITED STATES PATENT AND TRADEMARK OFFICE
CERTIFICATE OF CORRECTION

PATENT NO. : 4,710,120

DATED : December 1, 1987

INVENTOR(S) : James B. Chapman

It is certified that error appears in the above-identified patent and that said Letters Patent is hereby corrected as shown below:

In column 1, line 30, after "ring is", please insert therefor --held--.

In column 1, line 56, please delete "is" and insert therefor --in--.

In column 5, line 5, please delete "repsectively" and insert therefor --respectively--.

Signed and Sealed this

Fifteenth Day of November, 1988

Attest:

DONALD J. QUIGG

*Attesting Officer*  *Commissioner of Patents and Trademarks*